July 22, 1958  O. STROUKOFF  2,844,339
AIRCRAFT LANDING GEAR
Filed March 1, 1954  5 Sheets-Sheet 2
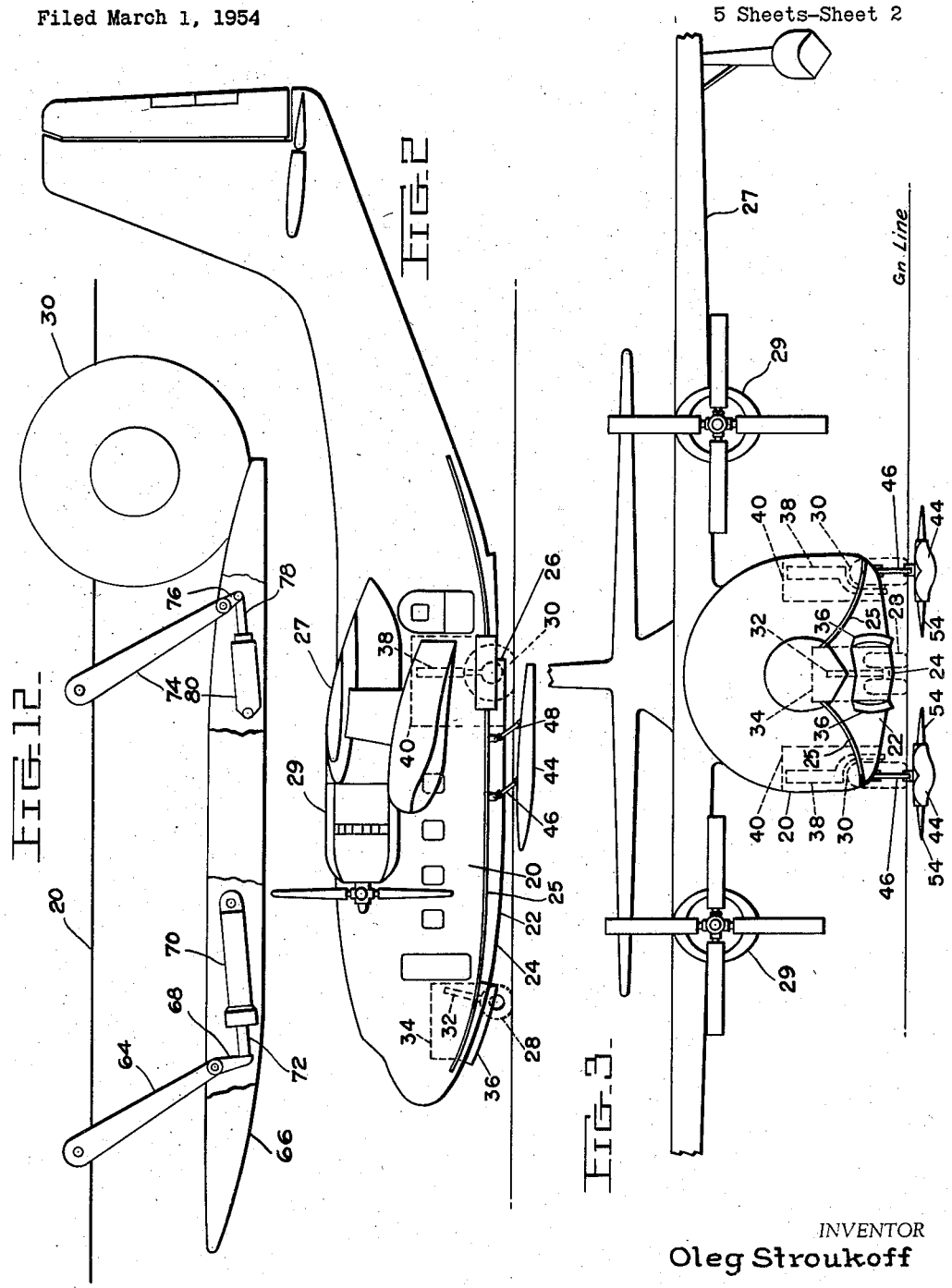
INVENTOR
Oleg Stroukoff
BY
ATTORNEY

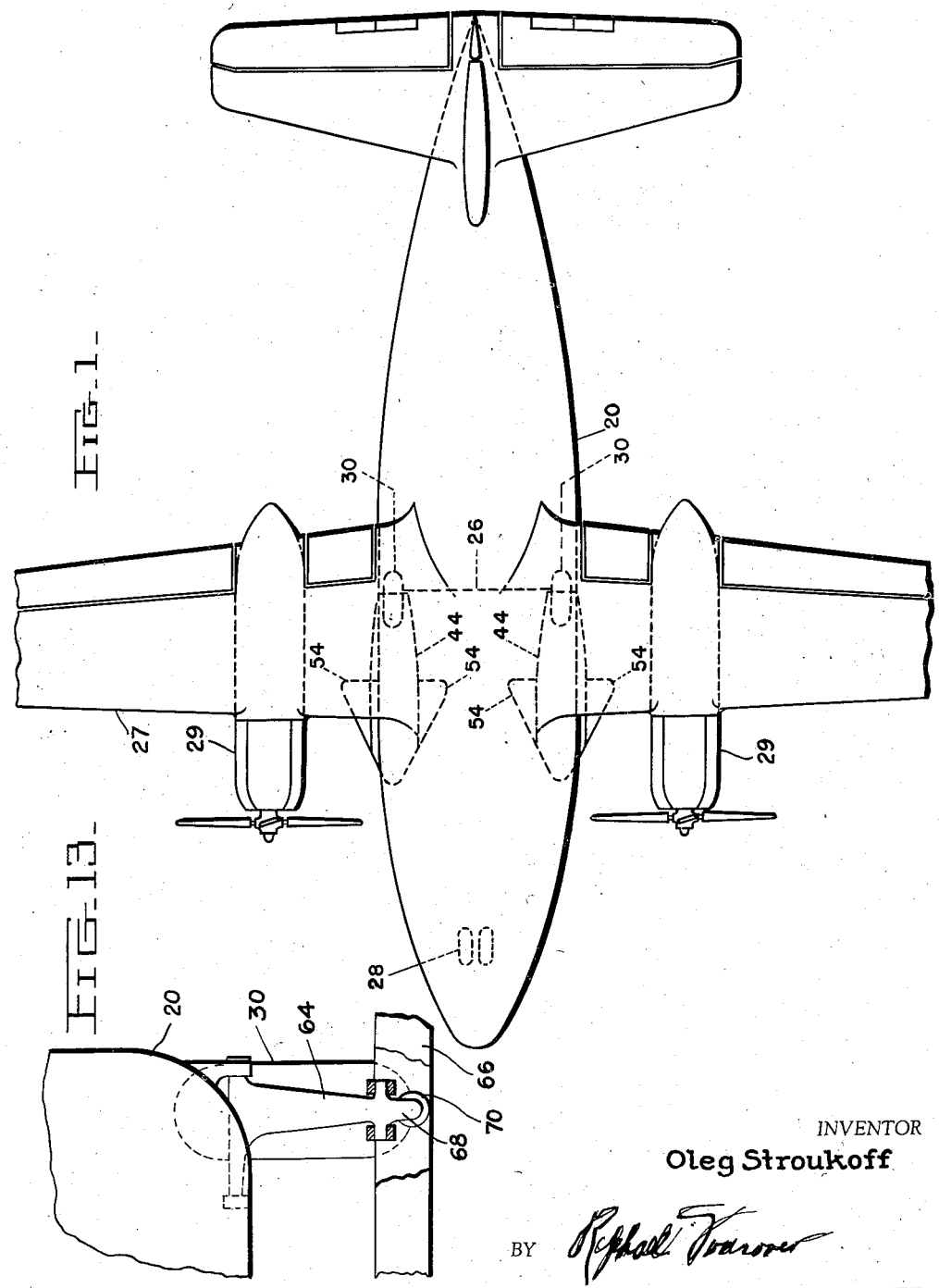

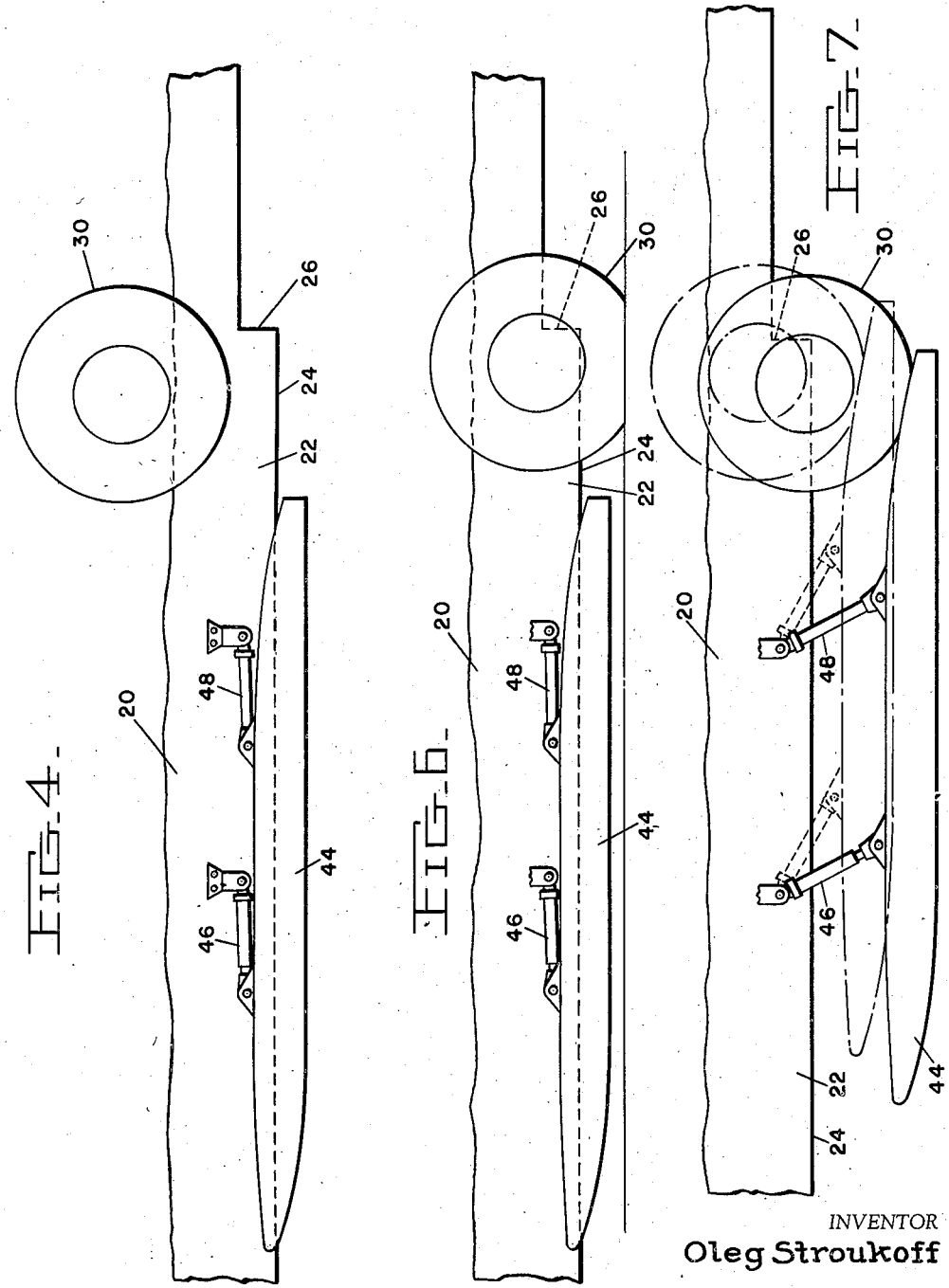

July 22, 1958  O. STROUKOFF  2,844,339
AIRCRAFT LANDING GEAR
Filed March 1, 1954  5 Sheets-Sheet 4
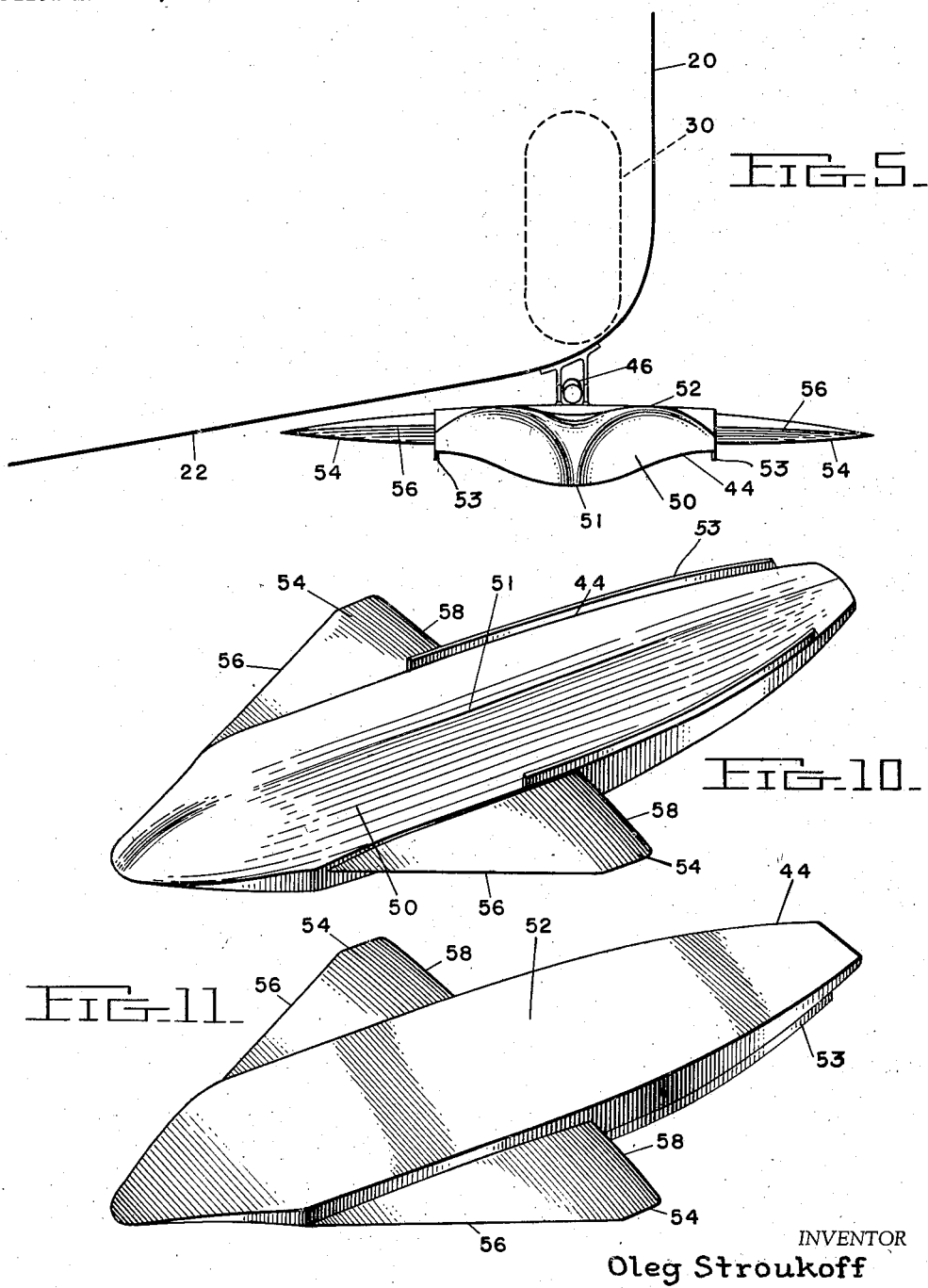
INVENTOR
Oleg Stroukoff
BY
ATTORNEY July 22, 1958
O. STROUKOFF
2,844,339
AIRCRAFT LANDING GEAR
Filed March 1, 1954
5 Sheets-Sheet 5
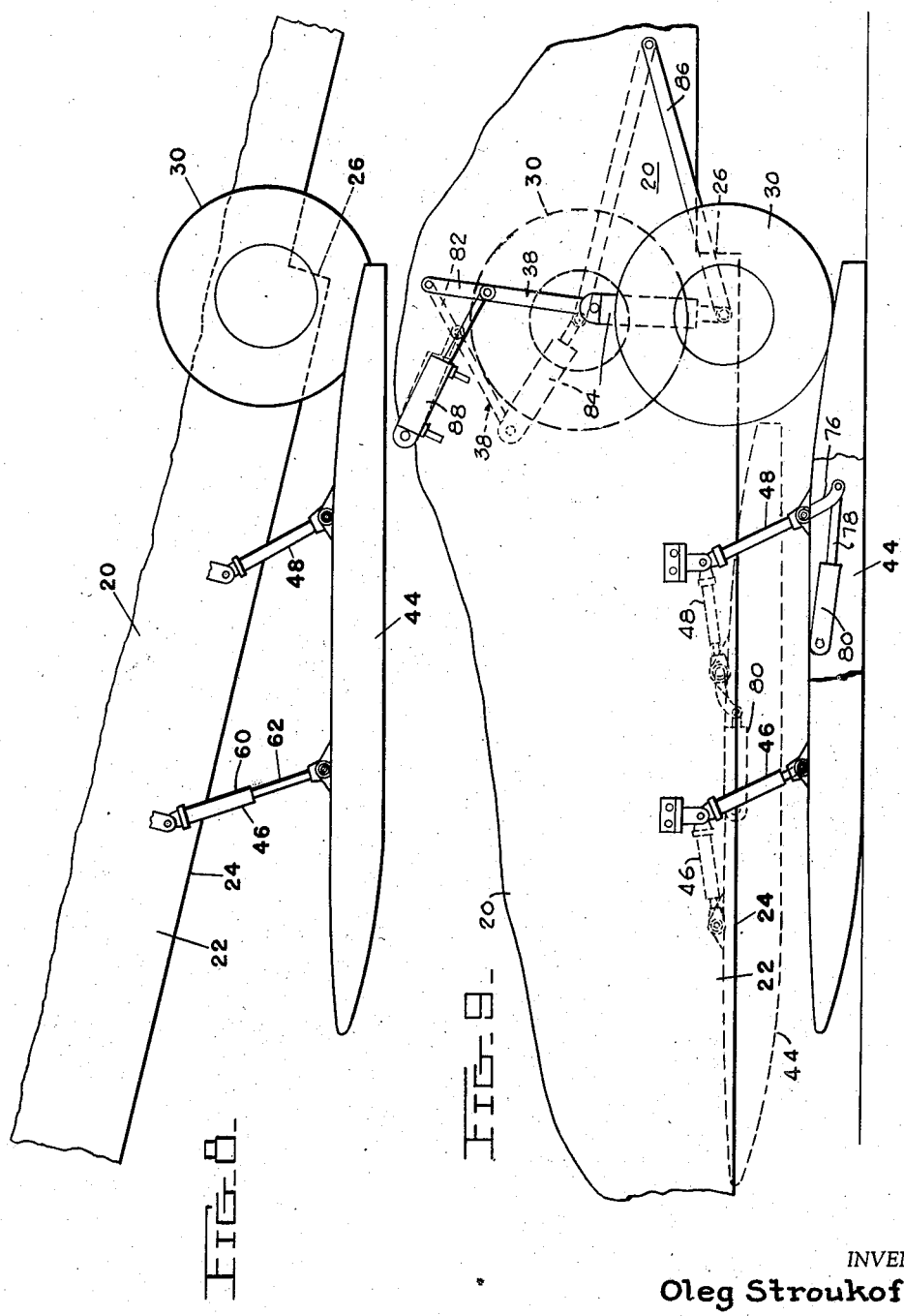
INVENTOR
Oleg Stroukoff
BY
ATTORNEY

United States Patent Office 2,844,339
Patented July 22, 1958

2,844,339

AIRCRAFT LANDING GEAR

Oleg Stroukoff, Trenton, N. J.

Application March 1, 1954, Serial No. 413,136

5 Claims. (Cl. 244—102)

This invention relates to aircraft and more particularly to aircraft landing gear for operation from land, water, snow and ice.

The advantages of an aircraft capable of landings and takeoffs on land, water, snow and ice are obvious. Heretofore, however, no aircraft has had practical aerodynamically efficient landing gear capable of such universal usage. For snow or ice operation aircraft are, conventionally, equipped with non-retractable aerodynamically-inefficient skis that are, sometimes, combined with non-retractable wheels for both land and snow operation. For water operation aircraft are, occasionally, equipped with non-retractable pontoons on their entire flotation gear but usually are provided with a buoyant boat-like hull. This latter type of aircraft, usually termed a flying boat, is frequently provided with retractable wheels for land operation, and, when so equipped, is truly amphibious. However, snow operation of an amphibious aircraft has heretofore not been possible without replacement of its wheels with skis, a structural modification which made both land and water operation impossible.

Accordingly, it is an object of this invention to provide an aircraft with landing gear capable of operation from land, water, snow or ice.

It is another object of this invention to provide an aircraft with landing gear which will fulfill the above object with maximum aerodynamic efficiency.

It is another object of this invention to provide an amphibious aircraft with water landing gear that has improved rough water landing and takeoff characteristics.

It is still another object of this invention to provide an aircraft with landing gear that meets the foregoing object and is also capable of snow and ice operation.

It is a further object of this invention to provide an aircraft with landing gear that meets all of the foregoing objects with simplicity of design and consequent economy of manufacture.

Other objects and advantages of the invention will become apparent from the following description and accompanying drawings in which:

Figure 1 is a fragmentary plan view of an aircraft having landing gear embodying this invention.

Figure 2 is a side view of the aircraft shown in Figure 1 with its water landing gear extended, the extended position of its landing gear being shown in dotted lines.

Figure 3 is a front view of the aircraft shown in Figure 2.

Figure 4 is an enlarged fragmentary, somewhat diagrammatic, side view of a portion of the aircraft showing its landing gear fully retracted for flight.

Figure 5 is an enlarged fragmentary front view corresponding to Figure 4.

Figure 6 is a view corresponding to Figure 4, but showing the landing gear in position for land operation.

Figure 7 is a view corresponding to Figure 4, but showing the landing gear in position for water, snow or ice landings.

Figure 8 is a view corresponding to Figure 7, but showing the position of the landing gear for a three-point or "nose-up" landing.

Figure 9 is a view corresponding to Figure 7, but showing additional details and, in dotted lines, the landing gear in retracted position.

Figure 10 is an enlarged perspective view of the underside of the combined snow and hydro-ski shown in Figures 2 and 3.

Figure 11 is a perspective view of the upper side of the ski shown in Figure 10.

Figure 12 is a view corresponding to Figure 7 but showing the incorporation of a shock-absorber in the ski mounting.

Figure 13 is a fragmentary front view corresponding to Figure 12.

Referring now to the drawings, there is shown in Figures 1, 2 and 3 an aircraft of the flying boat type having a relative wide buoyant body or hull 20 adapted for water takeoffs and landings. The hull 20 is boat-shaped, as is conventional, with an undersurface 22 that flares outwardly in opposite directions from a keel-line 24 to chines 25, the flare angle being more pronounced at the bow, and has a step 26 slightly aft of the center of gravity of the aircraft. The aircraft has a high wing 27 and is powered by internal combustion engines mounted in outboard wing nacelles 29.

For land operation, the aircraft is equipped with a retractable tricycle landing gear comprising a steerable dual nose wheel 28 and a pair of main landing wheels 30 which, when extended, are slightly forward of the step 26 and aft of the center of gravity of the aircraft. The nose wheel 28 is carried on a shock-absorbing column 32 that is pivotally connected to the aircraft at its upper end for complete retraction of the nose wheel within a pocket or well 34 in the hull 20 having watertight doors 36. The construction of the nose wheel landing gear may be conventional, save that the doors 36 closing the wheel-receiving well 34 are watertight. The main landing wheels 30 may be carried on columns 38 having their upper ends pivotally connected to the aircraft for complete retraction of the main wheels into side pockets 40 in the hull 20. The columns 38 also have shock-absorbers later described incorporated therein so that when the wheels carry the weight of the aircraft they assume the position shown in Figures 2, 3 and 6 relative to the aircraft. The construction of the main wheel landing gear and a pilot-controlled extending, retracting and locking mechanism therefor, may also be conventional and such as disclosed, for example in Patent No. 2,049,066. As shown in Figure 9, the strut or column 38 of such gear may be sectional and include upper and lower pivotally connected links 82 and 84, the upper link 82 being pivotally connected to the hull 20 and the lower pivotally carrying the wheel 30. The lower link 84 may have a shock absorber of the oleo type incorporated therein. A swinging arm 86 has one end thereof pivotally connected to the link 84, closely adjacent the wheel 30, and the other end thereof pivotally connected to the hull 20. The upper link 82 may be swung to move the wheel 30 from its extended position to its retracted position shown in the dotted lines in Figure 9, by a two-way hydraulic cylinder 88 having one end thereof pivotally connected to the link 82 and the other end thereof to the hull 20. Additionally, the nose and main landing wheels 28 and 30 are separately and independently retractable and extendable. Both the main and nose wheels 30 and 28 are provided with conventional pneumatic tires, and the main landing wheels 30, when fully extended, project only a relatively short distance (less than the diameter of a wheel 30) below the hull 20 because of the high wing design of the aircraft.

For landings on snow or ice or any solid medium having a reasonably low coefficient of sliding friction, e. g. mud and wet sand, and also for water landings, the aircraft is provided with a pair of combined snow and hydro-skis 44 disposed generally forwardly of and aligned longitudinally with the main landing wheels 30. Each ski 44 is retractably mounted on the aircraft by fore and aft rigid parallel substantially equi-length struts or links 46 and 48, respectively, having their opposite ends pivotally connected to the aircraft hull 20 and to fore and aft portions of the ski. In their retracted position the skis 44 are disposed closely adjacent the undersurface of the hull 20 and completely forwardly of the main landing wheels 30, as shown in Figures 4 and 5, from which position they can swing downwardly and rearwardly to the position shown in Figures 1, 7 and 9 wherein the aft portion of each ski is immediately beneath and is engaged by the corresponding main landing wheel 30 when the latter is extended as shown in Figures 7 and 9. In their extended position the skis 44 are so located relative to the center of gravity of the aircraft that the weight of the aircraft can rest entirely on the skis with complete longitudinal stability, i. e. even with the nose wheel 28 retracted. Appropriate power-operated, pilot-controlled mechanism is provided for retracting and extending the skis 44 independently of the wheels 30. Such mechanism, shown in Figure 9, may include a lever extension 76 on the lower end of the aft strut 48 of the ski 44. The end of the extension 76 is pivotally connected to the piston rod 78 of a two-way hydraulic cylinder 80, which is pivotally connected to the ski 44. Preferably, the cylinder 80 is powerful enough to jack up the aircraft by lowering the ski 44 from its retracted position, shown in dotted lines in Figure 9, downwardly into contact with snow, soft mud, etc., if such event becomes necessary because the aircraft has made a wheels-only landing and becomes stuck in a soft medium. In this connection, it will be noted that because of the forward position of the ski 44, when retracted, the main landing wheels 30 can be lowered and retracted without interference by the skis when the latter are in their retracted position. Appropriate mechanism (not shown) is also provided for locking the skis in their retracted position. Preferably, however, the skis are not locked in their extended position, but are relatively free to move upwardly and aft to the limited extent permitted by shock-absorbing movements of the wheels 30 as later described.

Each ski has a relatively sharp prow and a generally rearwardly tapering beam as shown in Figures 1, 10 and 11. The undersurface 50 of each ski is generally boat-shaped and flares outwardly from a keel line 51 to relatively aft spray controlling chines 53, with the flare angle being more pronounced at the bow and decreasing aft as shown in Figures 5 and 10. The upper surface 52 of each ski 44 is substantially transversely flat and curves downwardly aft to provide a progressively rearwardly tapering thickness from a point somewhat forward of the mid length of the ski, as shown in Figure 11. In side profile, each ski 44 is of somewhat aerofoil shape as shown best in Figures 4, 6 to 9, for aerodynamic efficiency. At both of its sides, each ski 44 is provided with a generally triangular laterally-extending stabilizer fin 54, the leading edge 56 of each fin being swept back at the same angle as, and merging smoothly with, the corresponding side of the prow of the ski, as shown in Figures 1, 10 and 11. The trailing edges 58 of each fin 54 extend generally at right angles to the ski 44 and are disposed about amidships of the latter. Thus, in plan view each ski 44 together with its fins 54 is somewhat arrowhead-shaped. The fins are considerably thinner than the body of the skis and have almost knife-edged leading and trailing edges 56 and 58.

For water, snow, ice, mud, etc. landings, the main landing wheels 30 are lowered or extended and locked, and the skis 44 are then extended to the position shown in Figure 7. In this position of the skis 44 and main landing wheels 30, the latter, as previously stated, engage the upper surface of aft portions of the skis behind their aft struts 48. Hence, since the skis 44 and their struts 46 and 48 are rearwardly inclined, the skis can move rearwardly and upwardly, except as obstructed by their engagement with the wheels 30, so that both the pneumatic tires of the wheels 30 and their shock absorbers absorb the impact of ski landings. When the weight of the aircraft is totally borne on the skis 44, e. g. on snow, etc., the position of the latter and of the wheels 30 relative to the hull 20 are shown in dotted lines on Figure 7.

In landing on water, the skis 44 plane and support the aircraft until the speed thereof decreases below a speed sufficient for the skis to support the weight of the aircraft by planing. At or slightly below this minimum planing speed, the skis 44 submerge until the hull 20 settles into the water and floats therein to support the entire weight of the aircraft. Because of their relatively small area as compared to the undersurface 22 of the hull, the skis 44 serve to smooth and stabilize landings in rough water. Reverse performance of the skis 44 takes place in water takeoffs. As the aircraft gains speed, the hull 20 slowly rises from the water until the skis break the surface thereof. Thereafter, the aircraft rides on the skis 44 and can accelerate rapidly to take-off speed because of greatly decreased water drag. In this connection it will be noted that the close proximity of the skis 44, when extended, to the hull 20 effects low water drag even before the aircraft planes on the skis. The fins 54 provide lateral stability for the skis 44 and also increase their area of planing support, particularly, at or near minimum planing speed. Additionally, the fins 54 also minimize bow waves, while the chines 53 control spray to minimize water drag.

In certain instances, it may be desirable to make a ski-landing with the aircraft in a "nose-up" or "nose-down" attitude. For this situation, the ski mountings are equipped with mechanism to change the attitude of the skis 44 relative to the aircraft so that the skis will be substantially horizontal on landing contact. For this purpose, the front supporting strut 46 of each ski 44 may be extensible and contractible, e. g. formed in two telescoping sections 60 and 62 with a watertight seal therebetween as shown in Figure 8 wherein the skis are positioned for a "nose-up" landing. The struts may be extended and contracted by any appropriate means (not shown), such as an interior jack screw driven by an electric motor and rotatably engaged with one strut section and threadedly engaged with the other section. Instead of actually being extensible, the forward ski struts 46 could be pivotally connected to one arm of a bell-crank (not shown) pivotally mounted on a transverse axis on the ski 44 with the one crank arm flush with the ski upper surface 52. Operation of the crank, e. g. by a hydraulic power cylinder (not shown), would raise the one crank arm above the surface of the ski 44 and, in effect, increase the length of the forward strut 46. For takeoff, the struts 46 ordinarily would be contracted to their normal length.

Because the skis are retractable in flight into a position close to the undersurface 22 of the hull 10, the aerodynamic efficiency of the aircraft is not appreciably lowered. In fact, because of their small frontal area and generally aerofoil configuration in side view, the skis 44 offer little aerodynamic and also little under-water drag.

It also will be seen that because the skis have a relatively narrow tread, i. e. are not positioned appreciably outboard of the hull, and the engines are located outboard of the skis, relatively large turning movements can be developed by the engines for ease of maneuvering the aircraft on snow, ice, etc. Additionally, since the skis, when extended, can still move aft somewhat against the cushion constituted by the shock absorbers for the wheels 30 and their pneumatic tires, the possibility of damage to the skis and/or the aircraft, by striking an obstacle with a ski in landing or take off is minimized. It also is pointed out that should the skis freeze down in ice or snow, the vertical displacement of the thrust line of the engines relative to the skis, will enable the engines to rock the aircraft forward to aid in breaking the skis loose.

Referring now to Figures 12 and 13 of the drawings, there is shown a modified embodiment of the invention. In this modification, the forward strut 64 of a ski 66 is extended, as at 68, downwardly beyond its point of pivotal connection to the skis into a recess in the latter. Mounted in the ski 66 aft of the strut extension 68 is a shock absorber 70 having a spring-pressed plunger 72 engaged with the extension 68.

In this arrangement, the aft movement of the ski in landing is shock-absorbed by the shock absorber 70. The shock absorber 70 also relieves the energy of movement of the relatively heavy mass of the ski 66 from striking the tire and the shock-absorber which comprises the shock-absorbing system of the wheel 30. Further, the shock-absorber 70 and the previously described cylinder 80 normally maintain the ski tight against the tire of the wheel 30 to avoid undesirable impacts or shocks therebetween.

It will be seen that the objects of this invention have been fully and effectively accomplished. It will be realized, however, that various changes may be made in the specific embodiments shown and described to illustrate the principles of the invention without departure from such principles. Therefore, this invention includes all modifications encompassed within the spirit and scope of the following claims.

I claim:

1. In an aircraft the combination of landing gear comprising: a landing wheel; means mounting said wheel on the aircraft for movement from a retracted to a locked extended position; power-operated means connected to said mounting means for effecting said wheel movement; a ski; parallel linkage strut means pivotally connected to fore and aft portions of said ski and to the aircraft, and mounting said ski on the aircraft for downward, rearward and upward swinging movement from a retracted to an extended position wherein said strut means is inclined downwardly and rearwardly, said parallel linkage strut means being so connected to the aircraft and so proportioned that when said ski is in its said extended position, an aft portion of said ski engages beneath said wheel when the latter is in its said extended position, to thereby limit further rearward and upward movement of said ski; and power-operated means connected to said strut means for effecting said swinging movement of said ski.

2. The structure defined in claim 1, including means for adjusting the effective length of that portion of the parallel linkage strut means connected to the fore portion of the ski in order to change the attitude of said ski relative to the aircraft.

3. The structure defined in claim 1, wherein the aircraft has a buoyant hull adapted for water take-offs and landings and the ski is a hydro-ski adapted for snow and/or water landings and take-offs.

4. The structure defined in claim 1, including shock absorbing means engageable with the parallel linkage strut means in the extended position of the ski for cushioning the engagement thereof with the wheel.

5. In an aircraft having a tricycle landing gear comprising a retractable nose wheel and a pair of retractable main wheels disposed aft and spaced laterally of the aircraft center of gravity, the combination of a pair of skis disposed generally forward of the main wheels and aligned longitudinally therewith; parallel linkage strut means pivotally connected to fore and aft portions of said skis and to the aircraft, and mounting said skis on the aircraft for downward, rearward, and upward swinging movement of said skis from a retracted to an extended position, wherein said strut means are inclined downwardly and rearwardly, said parallel linkage strut means being so connected to the aircraft and so proportioned that when said skis are in their said extended position, aft portions of said skis engage beneath the main wheels when the latter are in their extended position, to thereby limit further rearward and upward movement of said skis, said skis when in their extended position and engaged with the main wheels also being disposed so as to stably support the entire weight of the aircraft independently of the nose wheel; and power-operated means connected to said strut means for effecting said swinging movement of the skis.

References Cited in the file of this patent

UNITED STATES PATENTS

| | | |
|---|---|---|
| 2,021,876 | de Seversky | Nov. 19, 1935 |
| 2,106,934 | Saulnier | Feb. 1, 1942 |
| 2,302,343 | Noordwyn | Nov. 17, 1942 |
| 2,321,561 | Bircher | June 8, 1943 |
| 2,718,368 | Doolittle | Sept. 20, 1955 |
| 2,729,405 | Doolittle | Jan. 3, 1956 |

FOREIGN PATENTS

| | | |
|---|---|---|
| 109,571 | Sweden | Jan. 18, 1944 |
| 125,159 | Great Britain | Apr. 17, 1919 |
| 132,877 | Great Britain | Sept. 25, 1919 |
| 325,134 | Germany | Sept. 9, 1920 |
| 699,391 | France | Dec. 9, 1930 |
| 736,719 | Germany | June 25, 1943 |
| 943,917 | France | Mar. 22, 1949 |